Figure 6:
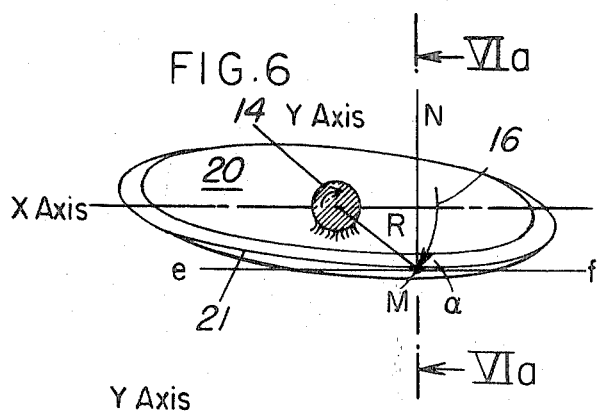

United States Patent

[11] 3,627,261

| [72] | Inventor | Edwin H. Ludeman<br>Red Bank, N.J. |
|---|---|---|
| [21] | Appl. No. | 858,791 |
| [22] | Filed | Sept. 17, 1969 |
| [45] | Patented | Dec. 14, 1971 |
| [73] | Assignee | Andrews Industries Incorporated<br>Dayton, N.J. |

[54] BALANCED ROTARY PLATE VALVE AND METHOD OF MAKING
10 Claims, 16 Drawing Figs.

[52] U.S. Cl. ..................................................... 251/305,
29/157.1
[51] Int. Cl. ..................................................... F16k 1/22,
B21d 53/10
[50] Field of Search ........................................... 251/283,
305, 306; 29/157.1

[56] References Cited
UNITED STATES PATENTS

| 2,058,996 | 10/1936 | Kollberg | 251/306 |
| 2,980,388 | 4/1961 | White | 251/307 X |
| 3,053,543 | 9/1962 | Kallin | 251/306 X |
| 3,144,040 | 8/1964 | White | 251/307 X |
| 3,172,424 | 3/1965 | Stillwagon | 251/298 X |
| 3,475,007 | 10/1969 | Fawkes | 251/305 |
| 3,480,254 | 11/1969 | Fawkes | 251/305 |

Primary Examiner—Henry T. Klinksiek
Attorney—Davis, Hoxie, Faithfull & Hapgood

ABSTRACT: A valve structure which includes an edge-sealing valve plate which swings about an axis between closed and open positions. The valve plate is balanced by locating the plate with respect to the axis of rotation such that pressure-induced force-moments about the valve stem axis of rotation sum to zero when the valve is closed. The valve-sealing surfaces are shaped and positioned with respect to the axis such that every portion of the sealing periphery of the valve plate moves with a motion component normal to the corresponding sealing surface of the valve seat of the valve body to provide a compressive seal about the entire sealing periphery upon the application of closing torque. Upon opening, the entire sealing periphery of the valve plate moves away from the valve seat.

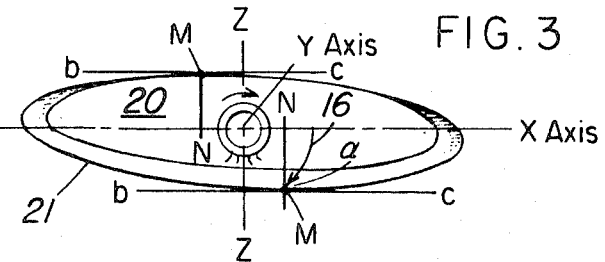
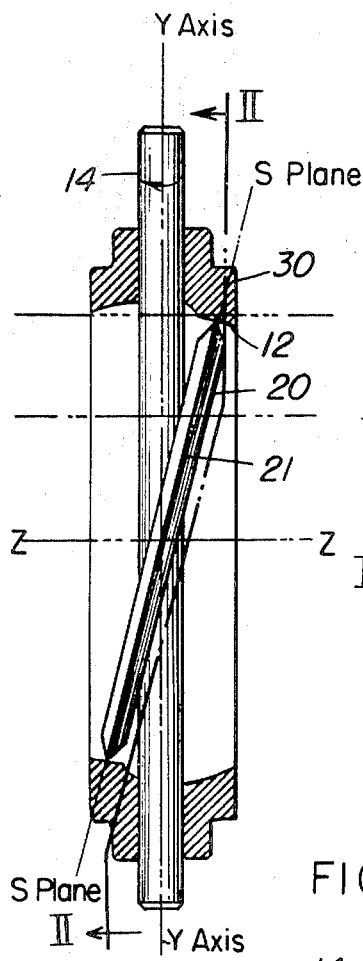
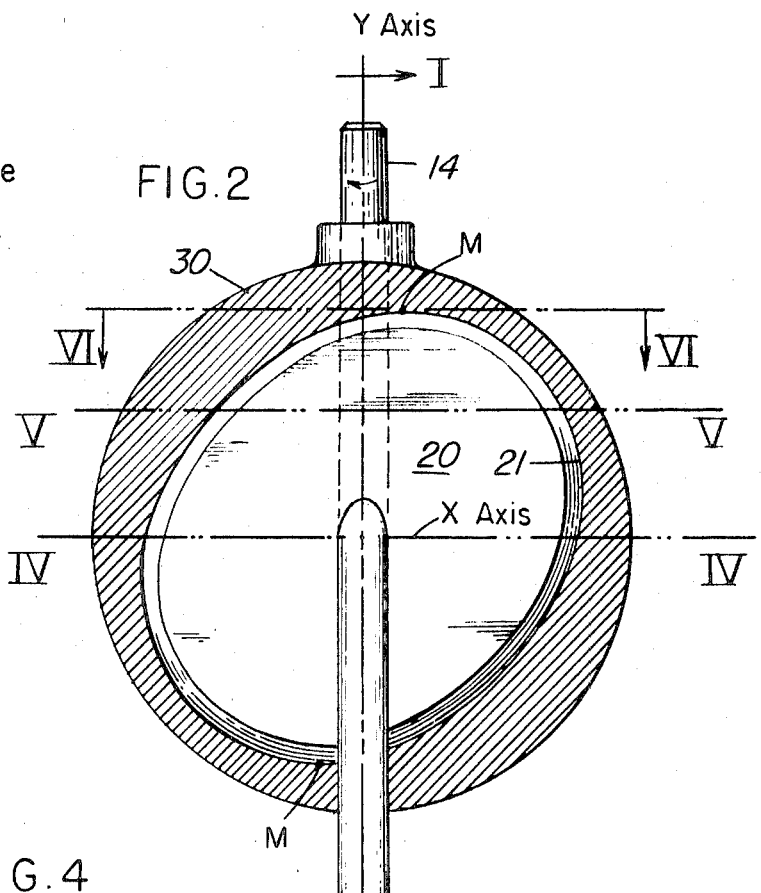
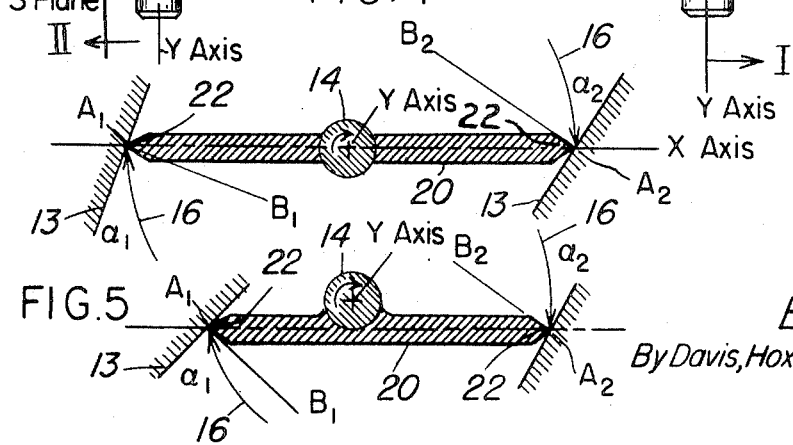

Inventor
Edwin H. Ludeman
By Davis, Hoxie, Faithfull & Hapgood
Attorneys

Inventor
Edwin H. Ludeman
By Davis, Hoxie, Faithfull & Hapgood
Attorneys

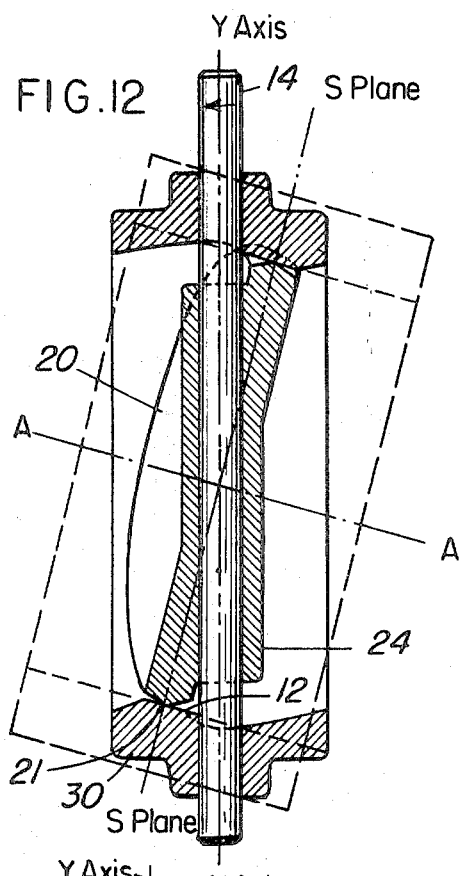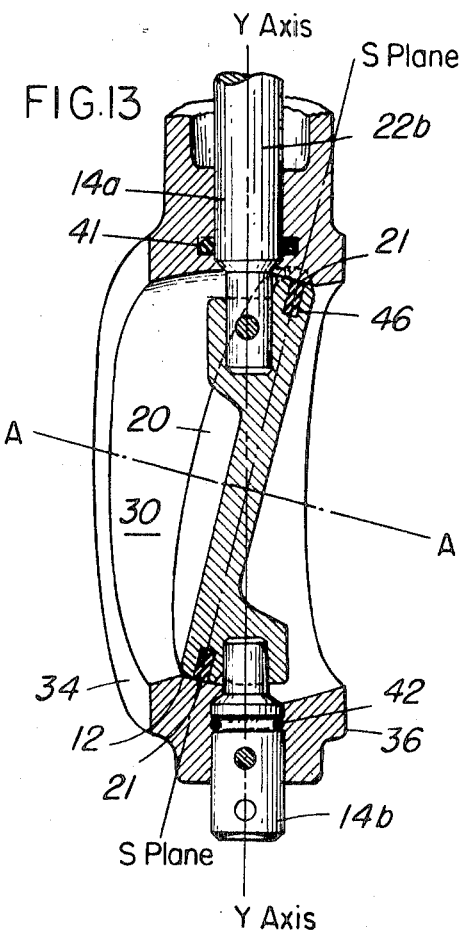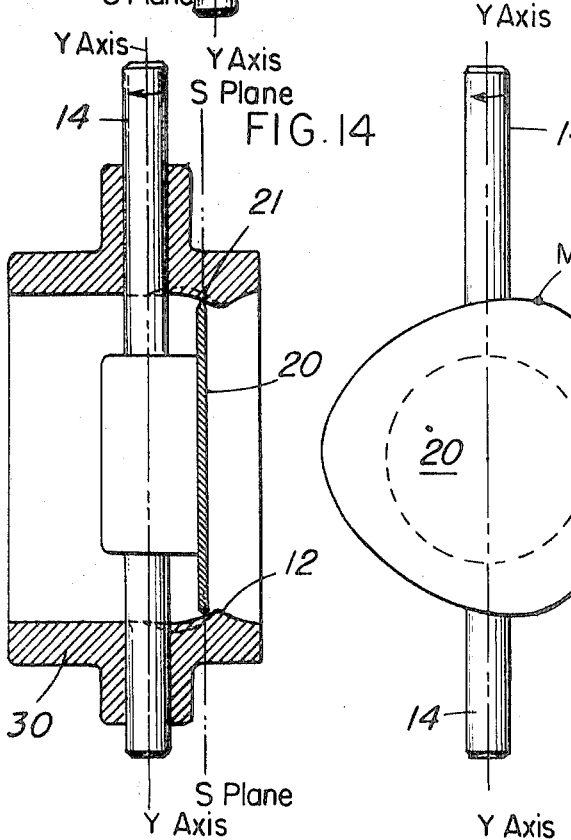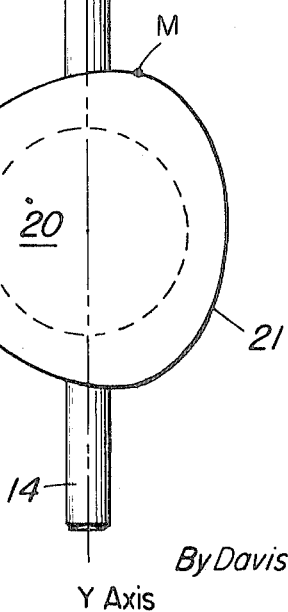

BALANCED ROTARY PLATE VALVE AND METHOD OF MAKING

BACKGROUND OF THE INVENTION

From the standpoint of reliable sealing and low wear or scoring of the sealing surfaces, a poppet valve is among the most suitable of valve types. In a poppet valve, the valve plate advances toward the seat in a direction parallel to the axis of the seat and makes initial contact with the seat surface. Further valve-closing motion results in compression of the entire circumference of the sealing surfaces of the seat and plate to provide a tight seal with minimal wear of the sealing surfaces. Relative closing motion of these sealing surfaces is such that there is mutual compression of these surfaces for sealing. The sealing surfaces part along their entire periphery upon incremental opening motion and further separate upon further opening motion. Flow commences evenly about the periphery. However, the valve plate of a poppet valve moves with respect to its seat such that the valve structure must alter the direction and cross-sectional shape of the flow stream in order for the stream to pass the valve plate in the open position. This manifests as a resistance to flow. A common example of poppet valves are gasoline engine intake and exhaust valves.

From the standpoints of low actuating force and minimal flow loss or pressure drop, the balanced butterfly valve is most suitable. A butterfly valve is one in which a valve plate revolves about a valve stem axis in or near the plane of the plate. By proper location of the axis of rotation with respect to the valve plate, the flow or pressure-induced force-moments on either side of the axis are made substantially equal and no net force couple due to pressure results when the valve is closed. The balanced valve displays little or no bias toward opening or closing with the result that little force is required to turn the valve stem. For fine control or for large valves, this balancing is a great advantage over unbalanced valves. Because the butterfly valve plate presents only an edge to the flowing stream this form of valve offers very low resistance to flow. This is highly desirable, particularly for high-velocity streams. One of the greatest disadvantages of the butterfly valve is that the sealing surface of the plate periphery moves with respect to the valve seat such that compressive sealing about the entire periphery is difficult to achieve. Some degree of compressive sealing can be arranged for those portions of the plate-sealing periphery remote from the poles of the axis of rotation. Compressive sealing cannot be obtained for those portions of the plate periphery near those poles because there is no motion component normal to the sealing surfaces. A sliding motion seal must be relied upon in the polar regions. Precompression of an elastomeric gasket in the polar regions aids in sealing such regions but increases seat wear and increases the torque needed to operate the valve. This inability to obtain a compressive seal about the entire periphery makes butterfly valves unsuitable for use where sealing integrity, low operating torque, or wear are important. A common example of a butterfly valve is the throttle plate in an automobile carburetor.

It is apparent that it would be desireable to develop a valve combining the advantages of the poppet and butterfly valves, but minimizing their respective disadvantages. A primary object of the present invention is to provide a valve resembling a butterfly valve in structure, but providing the sealing action and reliability of the poppet valve.

It is another object of the present invention to provide a balanced rotating-plate valve wherein the entire sealing surface of the valve plate is spaced from the valve seat surface when the valve rotated in the opening direction and wherein rotation of the valve stem in the closing direction swings the valve plate so that the sealing surfaces of the disc and valve seat approach each other and come into coextensive compressive contact when the valve is closed, and wherein further closing effort increases the compressive contact pressure around the entire periphery of the valve plate to provide a seal of a quality comparable to that of a conventional poppet valve.

It is still another object of the invention to provide a rotating valve plate wherein the configuration of the valve plate and the valve seat are such that the periphery of the valve plate is in continuous sealing contact with the valve seat when the valve is closed, but completely out of contact with the valve seat when the valve is opened. Thus, all points on the periphery of the valve plate break away from sealing contact with the valve seat immediately that the valve plate is moved away from the sealed condition.

The present invention combines the best features of the poppet valve with the best features of the balanced butterfly valve without retaining the serious disadvantages of either.

The above and other objectives of the present invention, which will become apparent hereinafter, are attained by providing a balanced rotating-plate valve having a valve body with a flow passage therethrough with a portion of the walls of the flow passage forming the valve seat. A valve plate is mounted within the flow passage of the valve body by means of a valve stem for rotation between a closed position wherein the valve plate peripheral edge is in continuous sealing engagement with the internal surface of the valve seat in the flow passage, and an open position wherein all portions of the valve plate peripheral edge are spaced from the valve seat surface in the flow passage. The valve plate, while having a suitable thickness and area of sealing contact in practice, for the purposes of initial discussion, may be considered to be a thin flat plate, the peripheral edge of which seals with an internal valve seat surface in a coextensive line of contact with the plate periphery. Practical embodiments of the valve will be described which depart from this flat plate in that they have substantial thickness and the peripheral edge is an area which coextensively contacts the valve seat sealing surface.

In a valve made in accordance with the present invention, any line erected normal to the sealing surfaces at any point of initial contact does not intersect the axis of rotation, nor is such a line parallel to this axis. Also a tangent to the arc of rotation at any point of initial contact of the periphery of the valve plate will intersect the valve seat surface at a finite angle of incidence as the valve is closed. Satisfaction of either of the above qualifications at all points on the line of contact will result in a compressive sealing force over the entirety of the line of contact when closing torque is applied to the valve stem.

Figure 6A:
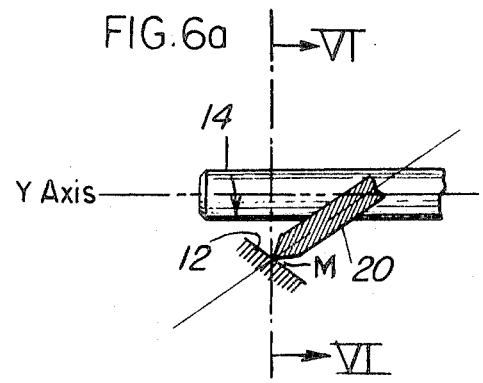
Figure 7:
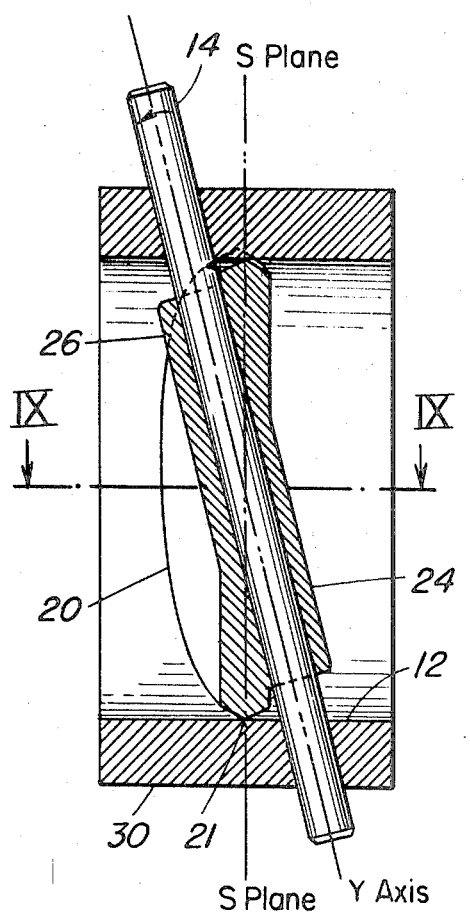
Figure 8:
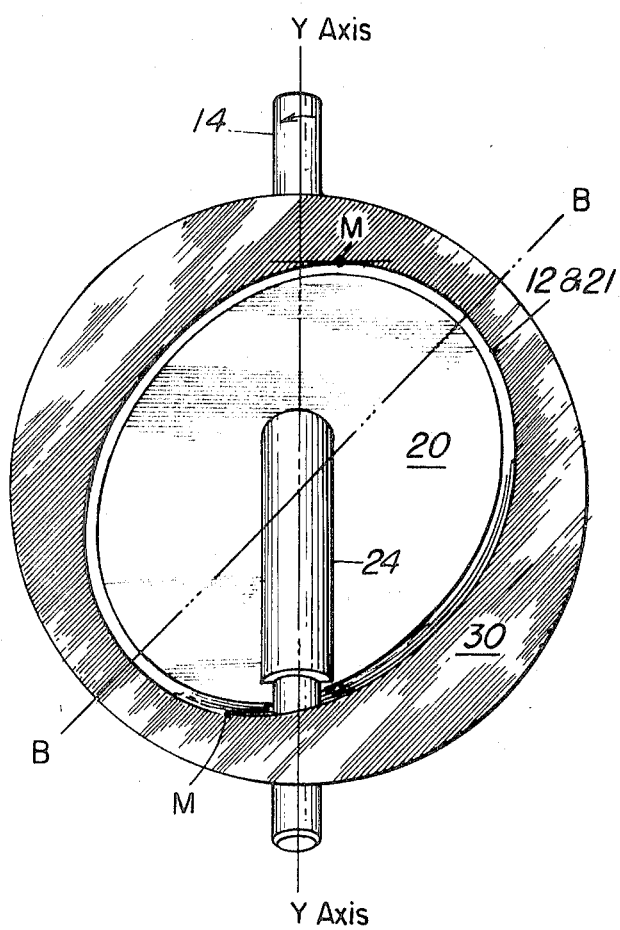
Figure 9:
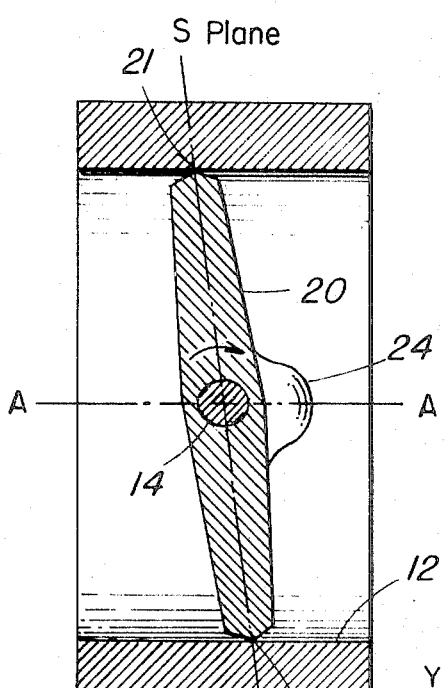
Figure 10:
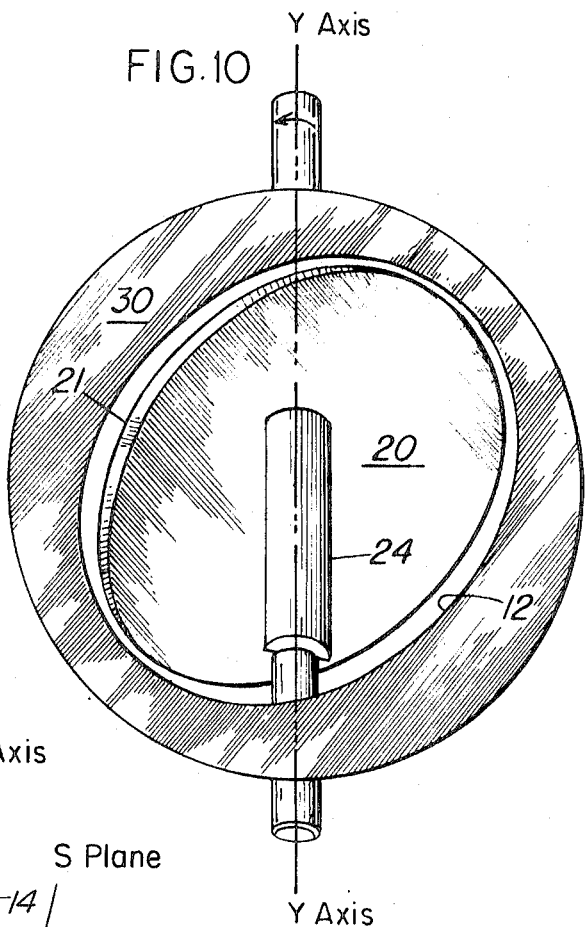
Figure 11:
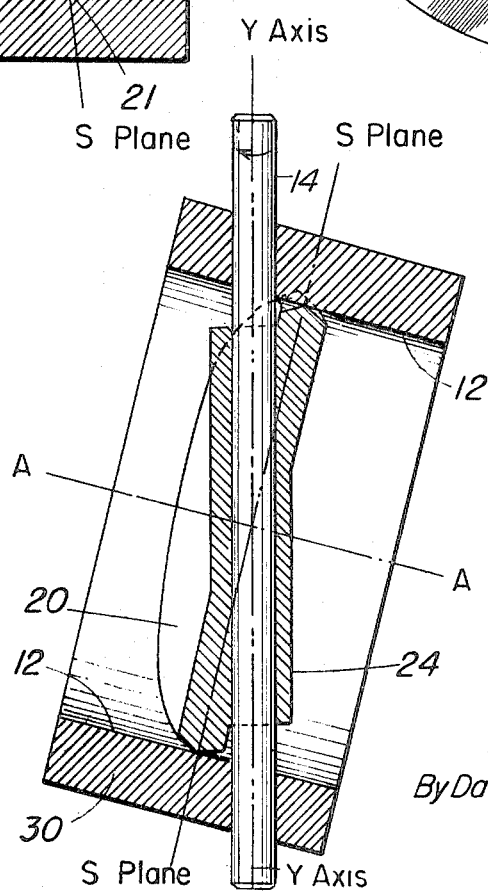

This novel valve concept is more readily understood by reference to the drawings in which:

FIG. 1 is an elevational view in section taken in plane I—I of FIG. 2 of a valve made in accordance with the present invention, FIG. 2 is a sectional view of the valve of FIG. 1 taken in cutting plane II—II, FIG. 3 is a top view of the valve plate and stem of the valve of FIG. 1, FIG. 4 is a sectional view taken in plane IV—IV of FIG. 2 of the valve plate and a portion of the valve seat, FIG. 5 is a sectional view taken in plane V—V of FIG. 2 of the valve plate and a portion of the valve seat, FIG. 6 is a view taken from plane VI—VI of FIG. 2 of the valve plate, FIG. 6a is a vertical section view taken in the plane VIa—VIa of FIG. 6, FIG. 7 is an elevational view in section of an embodiment of a valve made in accordance with the invention, FIG. 8 is an end view of the valve of FIG. 7, FIG. 9 is a sectional view taken in plane IX—IX of FIG. 7, FIG. 10 is a view similar to that of FIG. 8, but showing the valve plate rotated to a partially open position, FIG. 11 is a view similar to that of FIG. 7, but showing the valve assembly rotated to bring the valve stem into a vertical attitude, FIG. 12 is an elevational view in section showing another embodiment of the valve and showing in dotted lines a superposition of the embodiment of FIG. 11, FIG. 13 is a sectional view of a refinement of the valve of FIG. 13, FIG. 14 is an elevational view in section of further embodiment of a valve made in accordance with the present invention, and FIG. 15 is an end view of the valve plate and stem of the valve of FIG. 14.

Referring now to the drawings, FIGS. 1–6 are illustrative of a simple version of a valve embodying the present invention. A valve body casting 30 is pierced by a rotatable valve stem 14. The direction for valve-closing motion is clockwise as is indicated by the curved arrow. This convention of indication of closing motion is respected in all drawings. In the drawings the X, Y and Z axes are orthogonal. The Y axis is the valve stem axis of rotation. The X axis is in the plane of the sealing periphery of the plate. Affixed to the valve stem is the valve plate 20. In the valve of FIGS. 1–6, the valve stem 14 pierces the center of the valve plate. For simplification of the description, the valve plate of FIGS. 1–6 has a peripheral tapered edge which terminates in an edge contact line 21 which seals against the valve seat surface with metal-to-metal contact.

As can be observed from FIG. 2, the plate is of a noncircular configuration which is balanced on the valve stem Y axis to cancel out moments of force due to pressure. The valve is said to be balanced because the valve plate 20 produces no torque about the Y axis of the valve stem when the valve is closed.

It should be noted in FIG. 2 that, unlike most butterfly valves, the points M of maximum extent of the valve plate in the direction of the Y axis are displaced in the X direction from the valve stem axis Y. As shown in FIG. 2, the projection of the valve plate is asymmetrical about the valve stem axis, but is balanced. If the shape the projection of the plate 20 in the X–Y plane of FIG. 2 were considered to be a mathematical curve having an origin at the intersection of the X, Y, and Z axes, the displacement of the projections of the points M from the stem axis can also be expressed as the slope or derivative of the curve of the plate periphery, as projected on the X–Y plane, being equal to zero only at finite values of $x$.

The valve seat surface 12 on the interior of the valve body 30 is configured to coextensively contact the peripheral edge 21 of the valve plate 20 when the valve is closed. Thus, the valve seat surface 12 includes a line of contact with the peripheral edge 21 of the valve plate 20 upon closing.

It is the characteristic of all valves made in accordance with this invention that closing torque on the valve stem will produce a compressive force everywhere along the peripheral edge 21 or the coextensive line of contact on the valve seat surface. The valve seat surface 12 proximate the line of initial contact must be of a shape which will everywhere resolve a portion of the closing torque into a compressive force at the line of contact for sealing purposes. This characteristic ubiquitous compressive force is absent in the polar regions of maximum plate extent in the axial direction of the ordinary balanced butterfly valve.

The angle made between the arc described by movement of a point of contact on the valve plate peripheral sealing edge and the valve seat surface is called the angle of incidence. The angle of incidence is a determinative of the degree of compression which can be obtained at a particular point of contact. The arc lies in a plane perpendicular to the axis of rotation. The angle which that arc makes with the intersection line of the valve seat surface with that plane is called the angle of approach.

In order for there to be a compressive force, the angle of incidence must have a finite value. The existence of a finite value of the angle of incidence is insured by arranging the valve seat surface such that a finite value of the angle of approach $\alpha$ exists at all points of contact, and that the seat surface at any point of contact intersects the perpendicular plane containing the arc. The valve seat surface cannot anywhere lie in the perpendicular plane containing the arc because the angle of incidence becomes zero and the angle of approach becomes meaningless without an intersection.

FIGS. 3–6 will be used to demonstrate how a valve made in accordance with this invention achieves that distinguishing compressive sealing characteristic. FIG. 3 is a top view of the valve stem 14 and valve plate 20 of FIG. 1. Tangents $bc$ are shown at the points M of maximum extent of the peripheral edge 21 of the valve plate 20 in the direction of the axis of valve stem axis of rotation Y. Any perpendicular erected to the tangents bc at M does not intersect the valve stem Y axis. Lines MN are two of such perpendiculars. The importance of this fact will be brought out as the discussion of the invention proceeds.

FIGS. 4–6 show the valve of FIGS. 1 and 2 as seen from horizontal planes IV—IV, V—V, and VI—VI, which planes are each perpendicular to the valve stem Y axis. Referring now to FIG. 4, a section taken through the center of the valve, the valve plate 20 is shown in a closed position with its peripheral edge 21 intersecting the reference plane IV—IV at points 22 on the plate edge 21 coincident with the internal seat surface 12 of the body 30. The reference plane IV—IV intersects the seat surface 12 in lines 13. Points $A_1$ and $A_2$ are the points of initial contact between the edge seal line 21 of the plate 20 and the internal seat surface. Closing motion of the valve plate 20 is clockwise about the Y axis of the valve stem 14. The plate edge seal line 21 and intersection points 22 describe arcs 16 as the valve is rotated toward closure. Arcs 16 diverge from the internal seat surface intersections 13 at an angle of approach $\alpha$. In order to achieve a compressive component for sealing purposes at the coincidence of the point $A_1$ on the internal seat surface 12 and the point 22 on the valve plate seal line 21, it is necessary that angle of approach $\alpha$ always have a finite value. The value of $\alpha$ is not critical and can vary dependent upon the configuration of the seat surface 12 in the vicinity of the line of contact with the closed valve plate. Were $\alpha$ to become zero, the relative motion of point 22 and seat intersection line 13 would produce a sliding contact with no compressive component. With a finite angle of approach, valve plate rotation in the closing direction will tend to force point 22 against the seat surface intersection line 13, thereby creating a sealing compressive force and arresting further valve plate motion. Additional closing torque on the stem 14 will increase the sealing compressive force.

FIG. 5 shows the existence of angle $\alpha$ at the intersection of the valve plate and seat with reference plane V—V.

Perpendiculars $A_1 B_1$ and $A_2 B_2$ erected to the points of initial contact A do not intersect the Y axis. $A_1 B_1$ and $A_2 B_2$ are perpendicular to intersection lines 13.

It can readily be appreciated from FIGS. 4 and 5 that torque on the valve stem 14 in the closing direction as indicated by the curved arrow will force the peripheral sealing edge 21 of the valve plate 20 against the seat surface 12 on the body. It is this interference which gives rise to a compressive force at all points of contact. The angle of approach $\alpha$ is the angle between an arc of valve rotation at the point of contact and the intersection 13 of the valve seat surface. Angle $\alpha$ must have a finite value at every point along the line of contact if a compressive sealing force is to be derived from closing torque. This condition can also be expressed by observing that a perpendicular erected to the intersection 13 of the valve seat surface at the point of contact and in a plane perpendicular to the valve stem axis will not pass through that valve stem axis. Of course, if such a perpendicular did pass through the axis, it would be coincident with a radius to the point of contact and angle $\alpha$ would be reduced to zero.

The foregoing conditions prevail in certain known balanced butterfly valves at many points along the line of contact or seal line. These conditions are not satisfied in those butterflies at the points of the line of contact which constitute the maximum extent of the butterfly valve plate peripheral seal in the direction of its axis of rotation. These conditions are inadequately satisfied in the regions of the line of contact near those points. Hence, there can be no effective compressive sealing force in those regions of such a butterfly valve.

A valve made in accordance with the present invention differs from those known balanced butterfly valves in that effective compressive sealing force can be established over the entirety of the seal.

The regions of the valve plate of the present invention which constitute the maximum extent of the valve plate peripheral seal line 21 in the direction of the axis of rotation are proximate points M. FIGS. 2 and 3 show that maximum seal line excursion points M are not coincident with the Y axis of rotation as they would be in a conventional butterfly valve, but are displaced in both the X and Z directions.

In order to demonstrate the satisfaction of the conditions necessary for the generation of compressive force at the points M of maximum extent of the valve plate peripheral seal line 21, reference plane VI—VI is passed through one of points M perpendicular to the valve stem axis of rotation. FIG. 6 is a view taken from this plane showing the valve plate 20 as it extends below the reference plane VI—VI.

In FIG. 6 the peripheral sealing edge 21 of the valve plate 20 intersects the reference plane VI—VI, the plane of the paper of FIG. 6, only at point M. Line e–f is a line tangent to the valve seat surface 12 at the point of intersection of that surface with the reference plane VI—VI. The point of intersection is coincident with point M on the valve plate 20 when closed. Tangent e–f of FIG. 6 is coincident with tangent b–c of GIG. 3. A perpendicular to either of tangents e–f or b–c erected at point M does not intersect the Y axis of rotation. Line MN is that perpendicular which lies in the plane VI—VI. An arc 16 drawn at radius R to point M makes an angle α with the seat surface tangent e–f. FIG. 6a is a sectional view taken in a vertical plane VIa—VIa through the maximum point M.

FIG. 6a shows the relationship of the maximum point M of the peripheral edge 21 with the valve seat surface 12.

Geometric constructions similar to those made with FIGS. 4–6 can be made in any plane perpendicular to the valve stem Y axis of rotation. The lower point M can be analyzed in a manner similar to that of FIG. 6. Thus, angles of approach α everywhere exist with finite values and perpendiculars such as AB or MN to the intersection 13 of the seat surface 12 with a plane perpendicular to the valve stem Y axis of rotation do not intersect that axis. A compressive force can be generated everywhere along the line of initial sealing contact including point M, the maximum extent of the peripheral seal line in the axial direction. The existence of the geometric conditions necessary to the generation of that sealing compressive can be demonstrated everywhere along the line of initial contact of the valve plate peripheral sealing edge 21 and the valve seat surface 12.

The significance of the ubiquitous presence of conditions for compressive sealing permits valves made in accordance with the present invention to tightly seal about their entire periphery. This capability is absent from all other balanced rotating plate or balanced butterfly valves.

Thus, it can be demonstrated that at every point along the line of contact of the perimeter of the valve plate with the valve seat surface on the interior of the valve body a force component derived from a closing force couple exists to provide for mutual compression of the valve plate peripheral edge and the valve seat surface. This is the desirable characteristic of a poppet valve which accounts for the sealing integrity of that form of valve. This is the characteristic which distinguishes the embodiments of the present invention from other balanced rotating plate or butterfly valves.

For purposes of simplicity of explanation the valve plate has been illustrated as being a generally planar member and the peripheral sealing edge has been illustrated as a closed fair curve lying in a plane. The above-described characteristics of the present invention can be obtained with nonplanar or warped valve plates having a peripheral sealing edge which is a curve which lies in a warped plane. Such warped valve plates can be balanced as described by appropriate shaping of the peripheral sealing edge. Similarly, the sealing edge of the valve plate has been treated as being a narrow line. It is apparent that the entire edge surface of the plate could be used as the sealing surface in conjunction with an appropriately wide valve seat surface. Such a widened sealing surface can be considered to be a plurality of spaced sealing lines 21, each of which must fulfill the above-stated requirements.

FIGS. 7–10 show a simple version of the valve of the present invention. The valve plate 20 is affixed to a valve stem 14 having an axis of rotation Y, which Y axis penetrates the plane of the valve plate 20. Protruding bosses 24 and 26 are bored to receive the valve stem 14. The stem is fixed in the bore so that rotation of the valve stem 14 causes rotation of the valve plate 20. Plate 20 is provided with a peripheral edge 21 for sealing contact. The sealing periphery of the plate need not be edge such as 21. It could be a surface of finite width. Analysis of the valve is simplified by considering a plate with a line edge seal. The plate 20 is balanced in that pressure acting on the closed plate will not effect any rotation. Closing motion of the valve is in the direction of the arrow on the stem. The valve stem and the valve plate assembly may be carried in suitable bearings in the valve body 30. Valve body 30 includes a cylindrical bore having an axis A—A and a generally elliptical cross section.

FIG. 8 is an end view of the valve of FIG. 7. The elliptical cross section of the valve body bore is apparent. The highest and lowest points of the plate seal line 21 or of the elliptical body bore cross section, occur at points M displaced from the vertical center line. This displacement of the maximum points from the center line accounts for the dotted line continuation of the top of the valve plate 20 in FIG. 7. The valve plate is an ellipse symmetrical about line B—B.

FIG. 9 is a sectional view taken in the horizontal plane IX—IX of FIG. 7. It can be seen that the peripheral edge 21 of the valve plate 20 comes into initial contact with the valve seat surfaces of the bore of the valve body 30 in a line of initial contact which lies in a plane S which is tilted with respect to the axis A—A of the valve body bore.

FIG. 10 is an end view of the valve similar to the view of FIG. 8, but showing the valve partially opened by virtue of a small angular rotation of the valve stem 14 in the opening direction opposite to the curved arrow on the stem. It should be noted that a clearance between the valve plate edge 21 and the bore of the valve body 30 exists about the entire perimeter of the valve plate 20. This ubiquitous clearance is a distinct advantage of the valve of the present invention. A conventional balanced butterfly valve would show no clearance in the region of the poles of the valve stem axis and relatively great clearance at the horizontal extremities of the valve plate. In other words, the initial opening of a conventional butterfly would be in the shape of a pair of crescent shapes.

The removal of the perimeter of the valve plate from the valve seat provides a clearance about the entire perimeter of the valve plate as the plate is rotated. This clearance diminishes as the valve is closed. The diminishing clearance is another way of visualizing the origin of the compressive force on the contacting surfaces. When the valve is closed, the clearance completely disappears. Further motion in the closing direction causes further relative compression of the plate periphery and the valve seat surface for sealing purposes.

FIG. 11 shows a valve identical to that of FIG. 7 but tilted such that the valve stem is brought into a vertical attitude. Sections taken perpendicular to the valve stem axis would be similar to those of FIGS 4–6a. The existence of a finite angle of incidence and of a finite angle of approach can be demonstrated at such sections in a manner similar to that described in connection with FIGS. 4–6a.

FIG. 12 is a sectional view of a more refined embodiment of a valve of the sort shown in FIGS. 7–11. The configuration of the simplified valve of FIG. 11 is superimposed in dotted lines on FIG. 12 to show the similarity between these embodiments. It can be seen that the valve of FIG. 12 has a valve seat surface 12 which is of the same shape as the tipped elliptical cylinder of FIG. 11, but that the remainder of the bore of the valve body is generally symmetrical about a horizontal axis. The axis of the valve seat surface 12 is axis A—A, which axis coincides with the axis A—A of FIG. 11 which figure is superimposed in dotted lines on FIG. 12. Line S—S is the intersection of the plane S of the peripheral sealing edge 21 of the plate 20 with the paper.

FIG. 13 is a further refinement of the valve of FIG. 12. FIG. 3 is a sectional view in the same plane as FIG. 12. The flange-mating surfaces 34 and 36 of the valve body 30 are brought into parallel planes more nearly parallel with the plane S of the peripheral edge 21 valve plate 20. This brings the valve plate nearly transverse to the flow stream when closed. In other words, to arrive at the refinement of FIG. 14, the cylindrical valve seat axis A—A and the valve plate 20 of FIG. 7 were first tilted to bring the valve stem into a vertical position as is shown in FIG. 11. Then the bore of the valve body was reshaped into symmetry with a horizontal axis while retaining the seat axis A—A tilted with the result being shown in FIG. 12. Lastly, the flange-mating surfaces 34 and 36 were made parallel to each other and approximately parallel to the plane S of the valve plate when closed. The bore of the valve body is appropriately reshaped. This result is shown in FIG. 13.

FIG. 13 shows further refinements such as elastomeric O-ring seals 42 and 41 for prevention of leakage about the valve stem and an elastomeric seal 46 in a groove in the sealing perimeter of the valve plate 20. The configuration of the edge of the valve plate of FIG. 13 is such that the metal on either side of the elastomeric seal comes into sealing contact with the valve seat surface. Thus, there is established a metal-to-metal seal in addition to the elastomeric seal when the valve plate is rotated to its ultimate position upon closure. This metal-to-metal contact greatly improves the seal integrity of the valve over that which would be available solely by means of a compressed elastomer. High pressure tends to extrude the elastomer into a distorted configuration which is subject to rapid wear. The existence of a metal seal immediately on either side of the elastomer prevents its extrusion due to pressure. The result is a long-life seal suitable for high-pressure valves. The valve stem 14 is shown in divided or trunnion form as 14a and 14b since it is not necessary to have an integral valve stem traverse the whole of the valve plate.

FIG. 14 shows another embodiment of the invention wherein the valve stem axis Y and the plane S of the valve plate peripheral sealing edge 21 are each orthogonal to the axis of the bore of the valve body 30. FIG. 15 is a view taken in a plane parallel to plane S and shows only the valve plate 20 and stem 14 for clarity. The Y axis is parallel to plane S. In this embodiment, the configuration of the valve plate 20 perimeter 21 and of the coincident initial line of contact with the valve seat surface 12 is not circular. As with all balanced plate valves, the shape and location of the plate must be designed so as to result in no net force-moment about the axis of rotation. The shape of the valve plate edge and of the valve seat surface is generated so as to provide a component of the closing force vector at any point to lie in a plane of the valve plate at the line of contact so as to generate a compressive force for sealing purposes. The points M of maximum extent of the plate periphery in the direction of the Y axis of rotation are both on the same side of the Y axis in this embodiment.

Although the foregoing illustrative examples of valves possess peripheral sealing edge shapes which are symmetrical about some line, it is apparent that asymmetrical shapes can be used so long as the result is a balanced valve having a finite value for the angle of incidence at all points along the sealing surface.

In the foregoing description it has been assumed that the peripheral edge of the valve plate and the surface of the valve seat are rigid and that torque applied to the valve stem to obtain a compression seal does not change the geometry significantly. That is, location of the line of contact after the final valve stem torque application is assumed to be only minutely displaced from its initial location.

However, in valves using compressible or elastomeric seals where a relatively large deformation of the seals occurs during the valve-closing action there is a substantial change in the geometry between the initial and the final closing positions of the valve plate. Compressible seals can be used on the plate periphery, on the valve seat of the body, or on both.

It is convenient to divide the closing action of valves having deformable seals into three stages. In the first stage initial contact is made. At this time the aforementioned compression-generating concepts apply. This seal line is the line of initial contact that has been previously considered and for which a finite angle of incidence exists, etc.

In the second stage, compressive deformation of the sealing member occurs. This deformation is normally relatively rapid at first and then decreases in rate as further torque is applied to the valve stem. The rate of deformation may even reverse itself and allow an elastomer to reexpand slightly as the valve stem reaches the end of its travel. Such expansion produces an addition to the closing torque which can be used to hold the valve in a closed position.

In the third stage, the valve is in its ultimate closed position with the sealing member compressed about the entire periphery of the valve plate to form a tight seal. The line of contact of the sealing surfaces when the valve is in its ultimate closed position can be referred to as the ultimate seal line to differentiate it from the above-discussed initial line of contact.

Returning to a consideration of the first stage, the valve structure may be such that as the valve is closed the plate periphery contacts the valve seat surface throughout the entire periphery simultaneously. However, practical considerations, such as the streamlining of the valve body interior, etc., may suggest it would be preferable to provide a valve structure in which sealing contact is first made at two diametrically opposite points and then expands circumferentially around the plate from each such point until a complete line of sealing contact is established. During the initial closing action of such a valve there may exist no complete seal line, but only segments of such a line. The initial closing action may be designed and analyzed by dividing the periphery of the valve plate into suitable small segments of finite length and using them in a manner similar to that used with continuous lines of contact previously described in detail.

From the above it will be seen that each point on the periphery of a compressible or elastomeric sealing member approaches the corresponding sealing surface at a finite angle of incidence and angle of approach α as touches this surface, undergoes compression and possibly a partial reexpansion, and then forms a continuous ultimate seal line.

The above sequence is duplicated at every point on the periphery of the sealing member, but need not occur simultaneously at all points until all points become merged into an ultimate seal line when the plate reaches its final closed position.

It should be pointed out that valves can be designed such that the angles of incidence, degree of compression, etc., may be varied from point to point on the periphery of the plate. In some cases this is especially desirable. For example, in valves handling abrasive slurries, wear of the seal surfaces will occur. Compensation for this wear can be made by rotating the valve plate beyond its initial closed position. However, the wear will not be uniform around the circumference of the seal surfaces due to the variables o flow. Wear will, however, vary in a predictable pattern. The effectiveness of the above wear compensation may be maximized by adjusting the angles of incidence around the periphery in accordance with this wear pattern. With a given compensating rotation of the valve stem, greater compensation will be obtained by increasing the angle of incidence, less by decreasing this angle.

In some applications of valves made in accordance with the present invention, an elastomeric seal may be inappropriate because of the characteristics of the material being handled. In such instances a relatively inelastic deformable seal of a material such as soft metal may be used. The deformable material will assume the shape of the corresponding sealing surface to provide an intimate fit which serves as a seal. The compressive force available with the present invention is used to accomplish that deformation.

In certain applications using compressible or elastomeric sealing members it may be unnecessary to achieve a complete relaxation of the sealing member such that certain segments of the sealing member do not completely separate from the seat when the valve is fully opened. The invention provides the geometry necessary to further compress these segments of the sealing member upon closing from a less than completely relaxed condition while open.

I claim:

1. A valve comprising a body with a flow passage therethrough and a valve plate rotatably supported on a valve stem having an axis for rotation between closed and open positions, the valve plate being balanced against pressure-induced rotation when in the closed position, the valve body passage including a valve seat against which the periphery of the valve plate seals in a zone of contact, perpendiculars to which at any point neither intersect nor parallel the valve stem axis of rotation.

2. The valve of claim 1 wherein the periphery of the valve plate seals against the valve seat along a line of contact.

3. The valve of claim 1 wherein the periphery of the valve plate is a surface of finite area which is substantially contiguous with the valve seat surface when the valve is closed.

4. The valve of claim 1 wherein the periphery of the valve plate is compressively deformable.

5. The valve of claim 1 wherein the valve seat is compressively deformable.

6. The valve of claim 1 wherein the periphery of the valve plate is an elastomer.

7. The valve of claim 1 wherein the valve seat is an elastomer.

8. A valve comprising a body with a flow passage therethrough and a valve plate rotatably supported on a valve stem having an axis for rotation between closed and open positions, the valve plate being balanced against pressure-induced rotation when in the closed position, the valve body passage including a sealing means against which the periphery of the valve plate establishes an initial contact upon rotation in the closing direction, a normal to the sealing means at any point of initial contact neither intersecting nor paralleling the valve stem axis.

9. A valve comprising a body with a flow passage therethrough and a valve plate rotatably supported on a valve stem having an axis for rotation between closed and open positions, the valve plate being balanced against pressure-induced rotation in the closed position, the valve body passage including a valve seat against which the periphery of the valve plate seals in a zone of contact, the valve seat being a continuous uninterrupted surface, each portion of the valve seat surface in the zone of contact lying at a finite acute angle of incidence to the arc of rotation described by the corresponding portion of the valve plate periphery as the valve plate is rotated about the valve stem axis.

10. A method of forming the sealing surface of a valve having a body with a flow passage therethrough and a valve plate rotatably supported on a valve stem having an axis for rotation between closed and open positions, the valve plate being balanced against pressure-induced rotation when in the closed position, the valve body passage including a valve seat against which the periphery of the valve plate seals in a zone of contact, comprising of steps of;

constructing arcs of rotation of points on the valve plate periphery, the arcs being in parallel planes perpendicular to the valve stem axis, constructing tangents to the arcs at the points of initial sealing contact of the valve plate periphery with the valve seat, constructing a line to each point of tangency, the line being at a finite acute angle to the tangent, and connecting all such constructed lines to form the continuous sealing surface.

* * * * *